United States Patent
Miller et al.

(10) Patent No.: US 7,927,752 B2
(45) Date of Patent: Apr. 19, 2011

(54) INDIVIDUAL CELL SHORTING DURING STARTUP AND SHUTDOWN USING AN INTEGRATED SWITCH

(75) Inventors: Daniel P. Miller, Victor, NY (US);
Jeffrey A. Rock, Fairport, NY (US);
Carl M. Marsiglio, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1075 days.

(21) Appl. No.: 11/684,302

(22) Filed: Mar. 9, 2007

(65) Prior Publication Data
US 2008/0220294 A1 Sep. 11, 2008

(51) Int. Cl.
*H01M 8/24* (2006.01)
(52) U.S. Cl. .......................... 429/453; 429/428; 429/517
(58) Field of Classification Search .................. 429/453, 429/428, 517
See application file for complete search history.

(56) References Cited

U.S. PATENT DOCUMENTS

| | | | |
|---|---|---|---|
| 6,913,845 B2 | 7/2005 | Bekkedahl et al. | |
| 2004/0209150 A1 | 10/2004 | Rock et al. | |
| 2004/0224192 A1* | 11/2004 | Pearson | 429/13 |
| 2005/0064254 A1* | 3/2005 | Bourgeois | 429/18 |
| 2006/0147769 A1* | 7/2006 | Murphy et al. | 429/23 |

* cited by examiner

*Primary Examiner* — Dah-Wei D Yuan
*Assistant Examiner* — Zachary Best
(74) *Attorney, Agent, or Firm* — Fraser Clemens Martin & Miller LLC; J. Douglas Miller

(57) ABSTRACT

An electrical shorting device for a fuel cell is provided, wherein the shorting device includes an electrically conductive body and an actuator coupled to the conductive body and adapted to selectively position the body between an electrically conductive and a non-electrically conductive position to selectively provide electrical communication between an anode plate and a cathode plate of the fuel cell. The shorting device facilitates electrical shorting of individual cells during the startup and shutdown of the fuel cell to eliminate the electrical potential across a proton exchange membrane that causes a degradation of a catalyst layer disposed on an a surface of an electrode of the fuel cells.

15 Claims, 9 Drawing Sheets

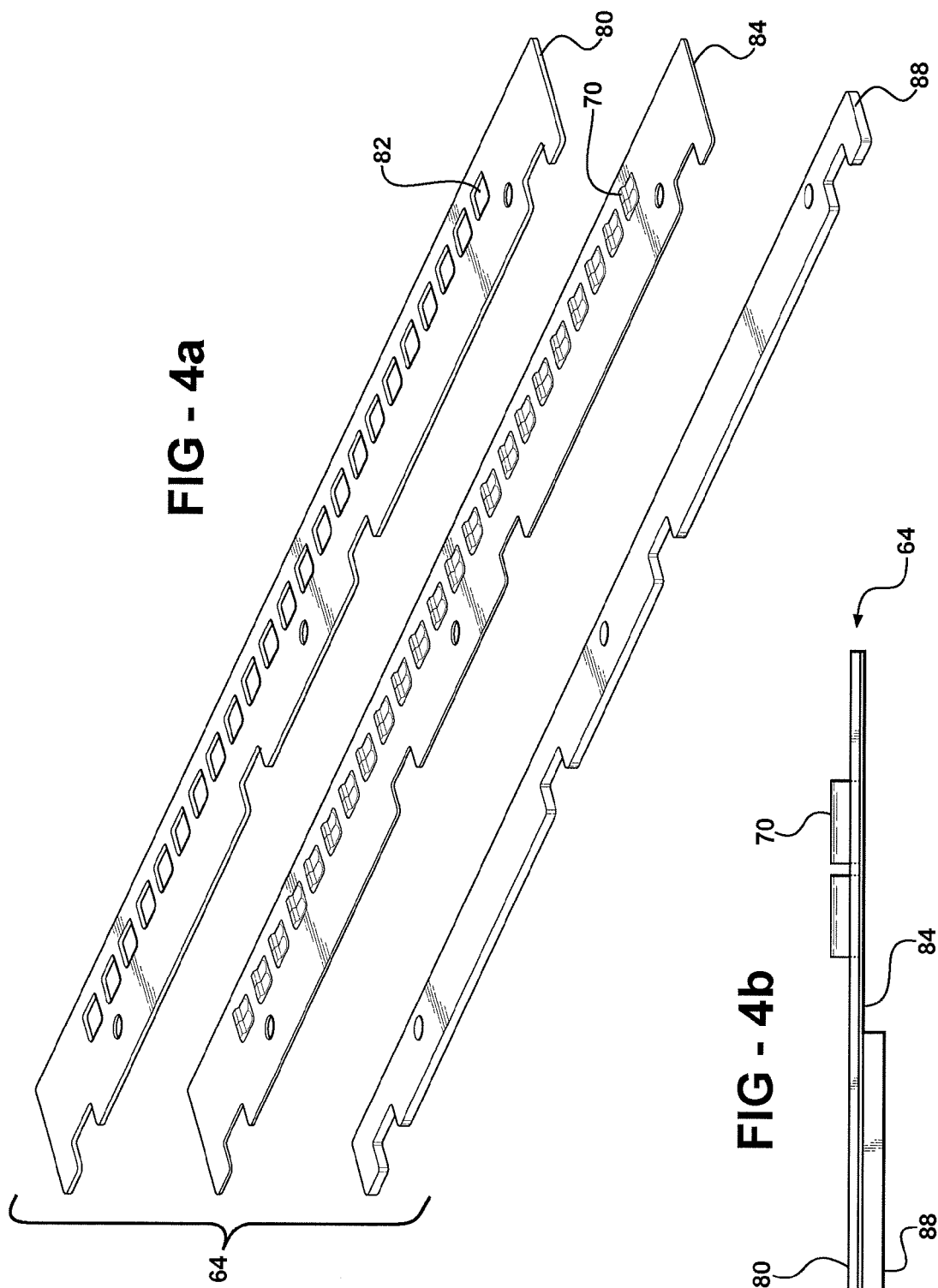
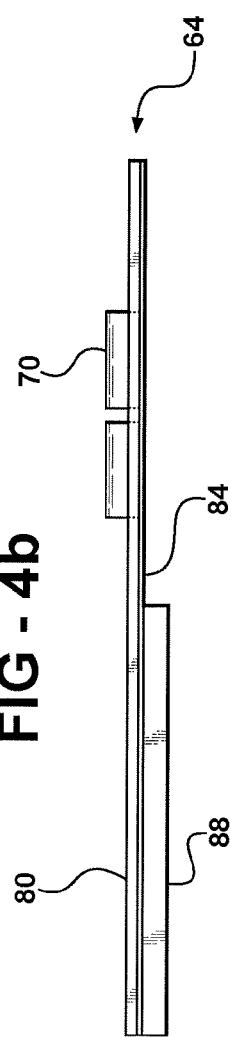

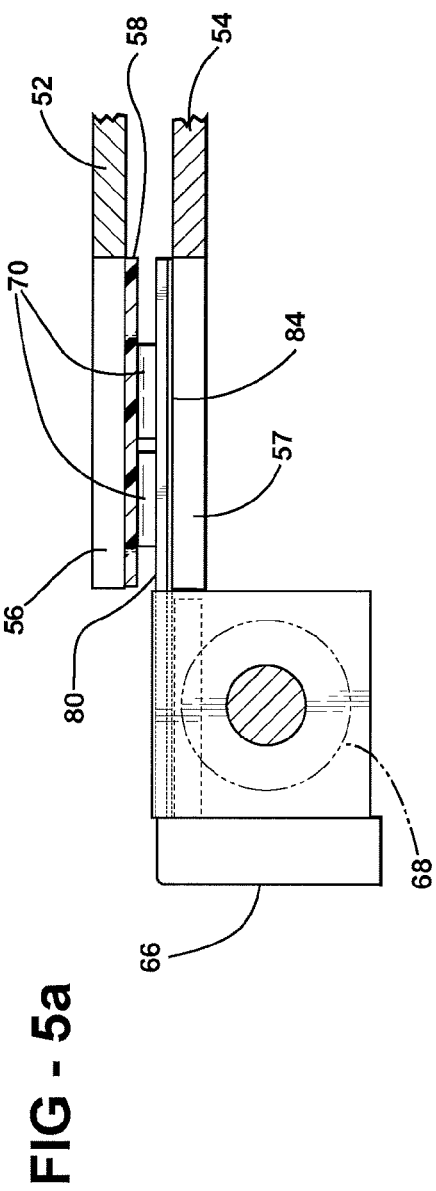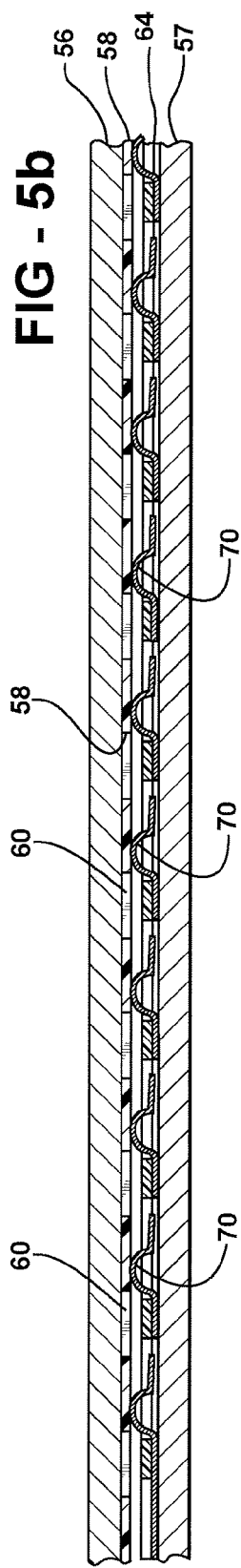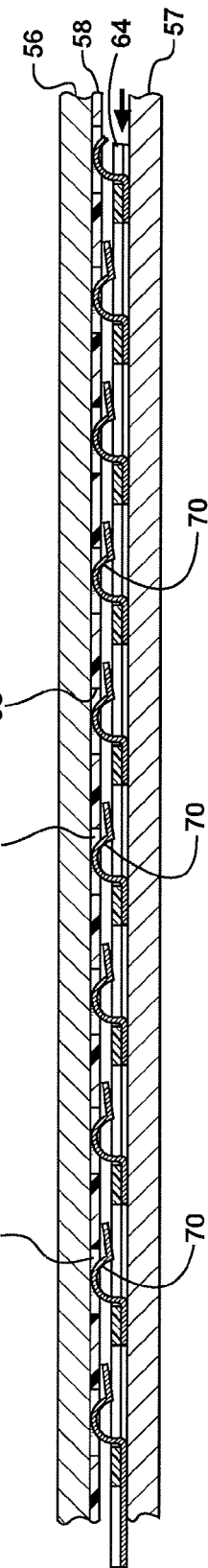

US 7,927,752 B2

INDIVIDUAL CELL SHORTING DURING STARTUP AND SHUTDOWN USING AN INTEGRATED SWITCH

FIELD OF THE INVENTION

The present invention relates to a fuel cell and more particularly to a shorting device adapted to selectively provide electrical communication between an anode plate and a cathode plate of the fuel cell to facilitate electrical shorting of individual cells during the startup and shutdown of the fuel cell.

BACKGROUND OF THE INVENTION

A hydrogen fuel cell is an electrochemical device that includes an anode and a cathode with an electrolyte therebetween. The anode receives a fuel such as hydrogen gas and the cathode receives an oxidant such as oxygen or air. Several fuel cells are typically combined in a fuel cell stack to generate a desired amount of power. A typical fuel cell stack for a vehicle may include several hundred individual cells. An illustrative fuel cell stack is disclosed in commonly owned U.S. Patent Application Publication No. 2004/0209150, hereby incorporated herein by reference in its entirety.

The fuel cell stack typically includes a wet end adapted to receive the fuel, oxidizer, and cooling fluids, and a dry end having an insulation end plate unit. The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack. The plurality of cells is commonly arranged in electrical series. Since single fuel cells can be assembled into stacks of varying sizes, systems can be designed to produce a desired energy output level. The stacks of varying sizes provide flexibility of design for different applications.

One type of fuel cell is a proton exchange membrane (PEM) fuel cell. The basic components of a PEM fuel cell are two electrodes separated by a polymer membrane electrolyte. Each electrode is coated on one side with a thin catalyst layer. The electrodes, catalyst, and membrane together form a membrane electrode assembly (MEA).

In a typical PEM fuel cell, the MEA is sandwiched between "anode" and "cathode" diffusion media (DM) or diffusion layers that are formed from a resilient, conductive, and gas permeable material such as carbon fabric or paper, for example. The DM serves as the primary current collectors for the anode and cathode as well as provides mechanical support for the MEA. The DM and MEA are pressed between a pair of electrically conductive plates which serve as secondary current collectors for collecting the current from the primary current collectors. The plates conduct current between adjacent cells internally of the stack (in the case of bipolar plates) and conduct current externally of the stack (in the case of monopolar plates at the end of the stack).

The secondary current collector plates each contain at least one active region that distributes the gaseous reactants over the major faces of the anode and cathode. These active regions, also known as flow fields, typically include a plurality of lands which engage the primary current collector and define a plurality of grooves or flow channels therebetween. The channels supply the hydrogen and the oxygen to the electrodes on either side of the PEM. In particular, the hydrogen flows through the channels to the anode where the catalyst promotes separation into protons and electrons. On the opposite side of the PEM, the oxygen flows through the channels to the cathode where the oxygen attracts the hydrogen protons through the PEM. The electrons are captured as useful energy through an external circuit and are combined with the protons and oxygen to produce water vapor at the cathode side.

The polarity of an individual fuel cell within the fuel cell stack can be reversed if the stack load attempts to draw more electrical current from the stack than the cell can generate. Because the cells are electrically coupled in series, a low performing cell may experience cell overload if the remaining cells are able to supply the stack load. Under these operating conditions, the cathode side of the low performing cell becomes more negative than the anode side of the low performing cell bipolar plate, causing a reversal of polarity.

The polarity of individual fuel cells is susceptible to reversal during startup and shutdown. In particular, during the startup of the fuel cell, the anode flow field is substantially free of hydrogen. The hydrogen enters the anode flow field at the inlet and over a transitional time period the entire flow field fills with hydrogen. There is an insufficient supply of hydrogen in the anode flow field during the transitional time period to provide the required electrical output. During a shutdown period, there is a similar transitional period when the flow field is purged of hydrogen, and may not have adequate hydrogen to provide the desired electrical output. In the absence of the hydrogen to oxidize, the fuel cell will oxidize the catalyst disposed on the electrodes. The oxidation causes a degradation of the catalyst that reduces the ability of the fuel cell to produce an electrical current. The cumulative degradation of the catalyst during startup and shutdown eventually reduces the electrical output to such a level where the fuel cell stack must be rebuilt or replaced.

It is desirable to produce a fuel cell that militates against a polarity reversal of the fuel cell and minimizes a catalyst degradation caused by the polarity reversal of the fuel cell.

SUMMARY OF THE INVENTION

Compatible and attuned with the present invention, a shorting device militating against a polarity reversal of the fuel cell and minimizing a catalyst degradation caused by the polarity reversal of the fuel cell has surprisingly been discovered.

In one embodiment, a fuel cell comprises an electrically conductive body; a holder coupled to the body, the holder adapted to provide a movement to the body; and an actuator coupled to the holder, the actuator adapted to position the body and selectively provide an electrical communication between an anode plate and a cathode plate of the fuel cell.

In another embodiment, a fuel cell stack comprises at least one anode plate and at least one cathode plate; at least one proton exchange member disposed between the anode plate and cathode plate; and at least one shorting device disposed between the anode plate and cathode plate, the shorting device including: an electrically conductive body; a holder coupled to the body, the holder adapted to provide a movement to the body; and an actuator coupled to the holder, the actuator adapted to position the body and selectively provide an electrical communication between the anode plate and the cathode plate of the fuel cell.

In another embodiment, a fuel cell stack comprises at least a first bipolar plate and a second bipolar plate, each bipolar plate having an anode side and a cathode side, wherein the anode side of the first bipolar plate faces the cathode side of the second bipolar plate; at least one proton exchange member disposed between the anode side of the first bipolar plate and the cathode side of the second bipolar plate; at least one shorting device adapted to selectively provide electrical communication between the at least one first bipolar plate and the second bipolar plate.

DESCRIPTION OF THE DRAWINGS

The above, as well as other advantages of the present invention, will become readily apparent to those skilled in the art from the following detailed description, when considered in the light of the accompanying drawings:

FIG. 4a is an exploded perspective view of an electrically conductive body in the shorting device shown in FIG. 2;

FIG. 4b is an end elevational view of the electrically conductive body shown in FIG. 4a;

FIG. 5a is an end elevational view of the shorting device of FIG. 2 showing the shorting device disposed between conductive wings of adjacent fuel cell plates;

FIG. 5b is an enlarged fragmentary side elevational view of the fuel cell of FIG. 2 showing the shorting device in the open (non-shorted) position;

FIG. 5c is an enlarged fragmentary side elevational view of the fuel cell of FIG. 2 showing the shorting device in the closed (shorted) position;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
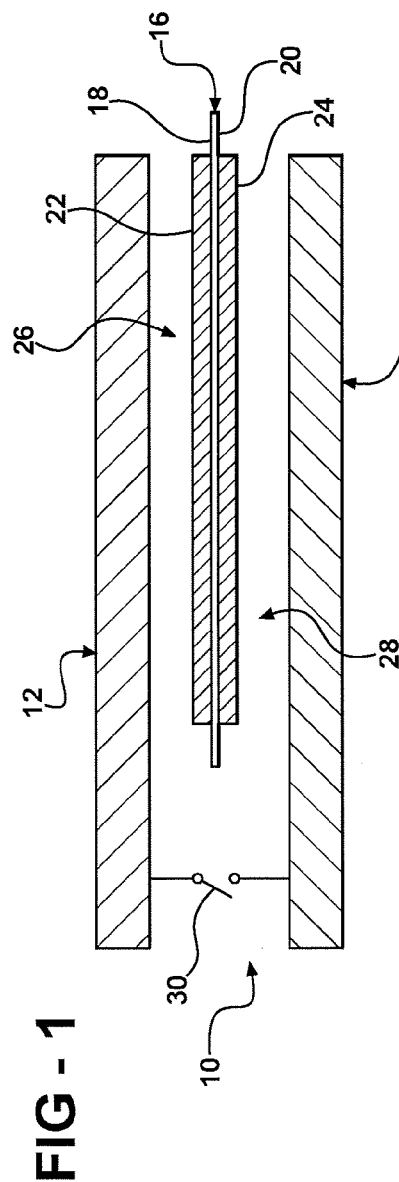
FIG. 1 is a cross-sectional side view of a fuel cell including a shorting device that selectively provides an electrical shorting of the fuel cell in accordance with an embodiment of the invention.

FIG. 1 shows one fuel cell 10 of a fuel cell stack (not shown). The fuel cell 10 has an anode side bipolar plate 12 and a cathode side bipolar plate 14 with a membrane electrode assembly (MEA) 16 positioned therebetween. A catalyst layer (not shown) is disposed on an upper surface 18 and a lower surface 20 of the MEA 16. An anode diffusion media layer 22 is positioned adjacent the upper surface 18 of the MEA 16 and a cathode diffusion media 24 is positioned adjacent the lower surface 20 of the MEA 16. The diffusion media layers 22, 24 are porous and provide for gas transport to and water transport from the MEA 16.

An anode flow channel 26 is formed between the anode diffusion media layer 22 and the anode side bipolar plate 12. A cathode flow channel 28 is formed between the cathode diffusion media layer 24 and the cathode side bipolar plate 14. The flow channels 26, 28 are one of a plurality of channels that respectively cooperate to form a so-called "flow field" (not shown) on an outer surface of each bipolar plate 12, 14 for distributing a fuel and an oxidant gas, respectively, over the upper surface 18 and the lower surface 20 of the MEA 16. In the embodiment described herein, the fuel is hydrogen and the oxidant is oxygen, although it is understood that other fuels and oxidants can be used as desired. An electrical shorting device 30 is provided between the anode side bipolar plate 12 and the cathode side bipolar plate 14. The shorting device 30 is a switch that when closed provides electrical communication between the anode side bipolar plate 12 and the cathode side bipolar plate 14. When closed, the switch 30 minimizes an electrical potential between the anode side bipolar plate 12 and the cathode side bipolar plate 14, substantially electrically shorting the fuel cell 10. As used herein, the terms "electrical shorting" and "shorting out" are defined as providing a low resistance electrical path between two adjacent plates, which allows a current to flow therebetween rather than to other structures.

During a normal operation of the fuel cell 10, hydrogen ions migrate from the anode side 12 to the cathode side 14 of the fuel cell 10. However, during a startup and a shutdown of the fuel cell, the hydrogen fuel is not evenly distributed within the anode side 12. A maldistribution of the hydrogen can lead to a polarity reversal in the fuel cell 10. The reverse current flow causes a degradation of the catalyst layers. The degradation to the catalyst layers reduces the electrical output of the fuel cell 10. A cumulative degradation of the catalyst layers occurs from the reverse current occurring during repeated startup and shutdown of the fuel cell 10.

The shorting device 30 can be employed during the startup and the shutdown of the fuel cell 10 to militate against the reverse current flow and the subsequent degradation of the catalyst layers. The shorting device 30 is closed during the startup and the shutdown of the fuel cell 10, minimizing the electrical potential between the anode side bipolar plate 12 and the cathode side bipolar plate 14. The shorting device 30 can be opened at a desired time when hydrogen flow is balanced throughout the anode side bipolar plate 12 and the opportunity for the reversed current flow has passed.

Figure 2:
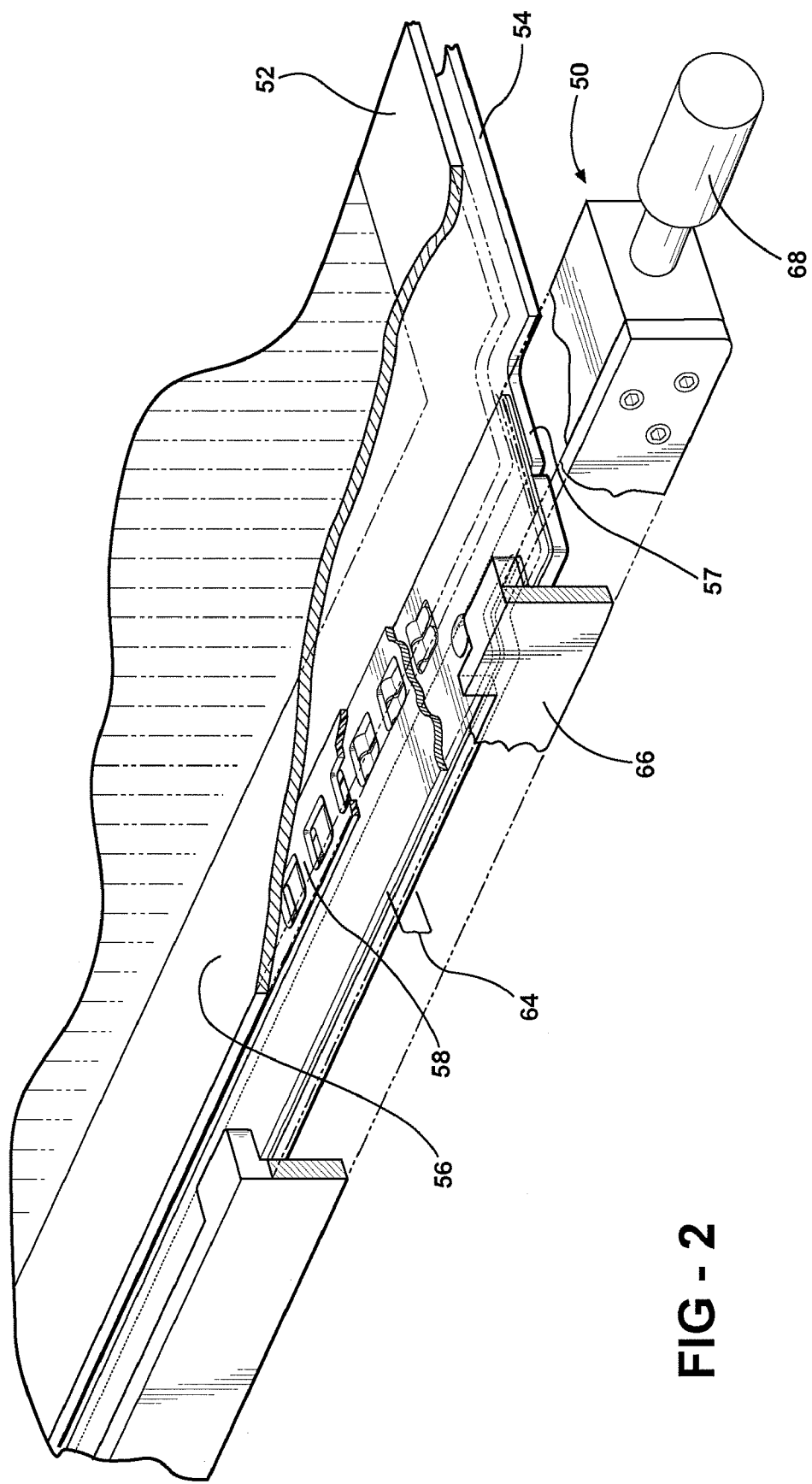
FIG. 2 is a fragmentary perspective view of the shorting device illustrated in FIG. 1 and showing an anode plate of the fuel cell.

FIG. 2 illustrates an electrical shorting device 50 according to an embodiment of the invention. The electrical shorting device 50 is disposed between an anode side fuel cell plate 52 and a cathode side fuel cell plate 54. A first conductive wing 56 extends laterally outwardly from an edge of the anode side fuel cell plate 52 and a second conductive wing 57 extends laterally outwardly from an edge of the cathode side fuel cell plate 54. The conductive wings 56, 57 are adapted to provide electrical communication between the fuel cell plates 52, 54 and the electrical shorting device 50.

The shorting device 50 includes an electrically conductive body 64 and a holder 66 coupled to the body 64. The holder 66 is adapted to slide in substantial alignment with the conductive wings 56, 57. An actuator 68 is in communication with the holder 66 and facilitates selective horizontal positioning of the holder 66 and the body 64. It is understood the actuator 68 can be any driving mechanism such as an electrical or a mechanical actuator, for example. In the embodiment shown, the actuator 68 includes one of a piston, a solenoid, and a cam.

Figure 3:
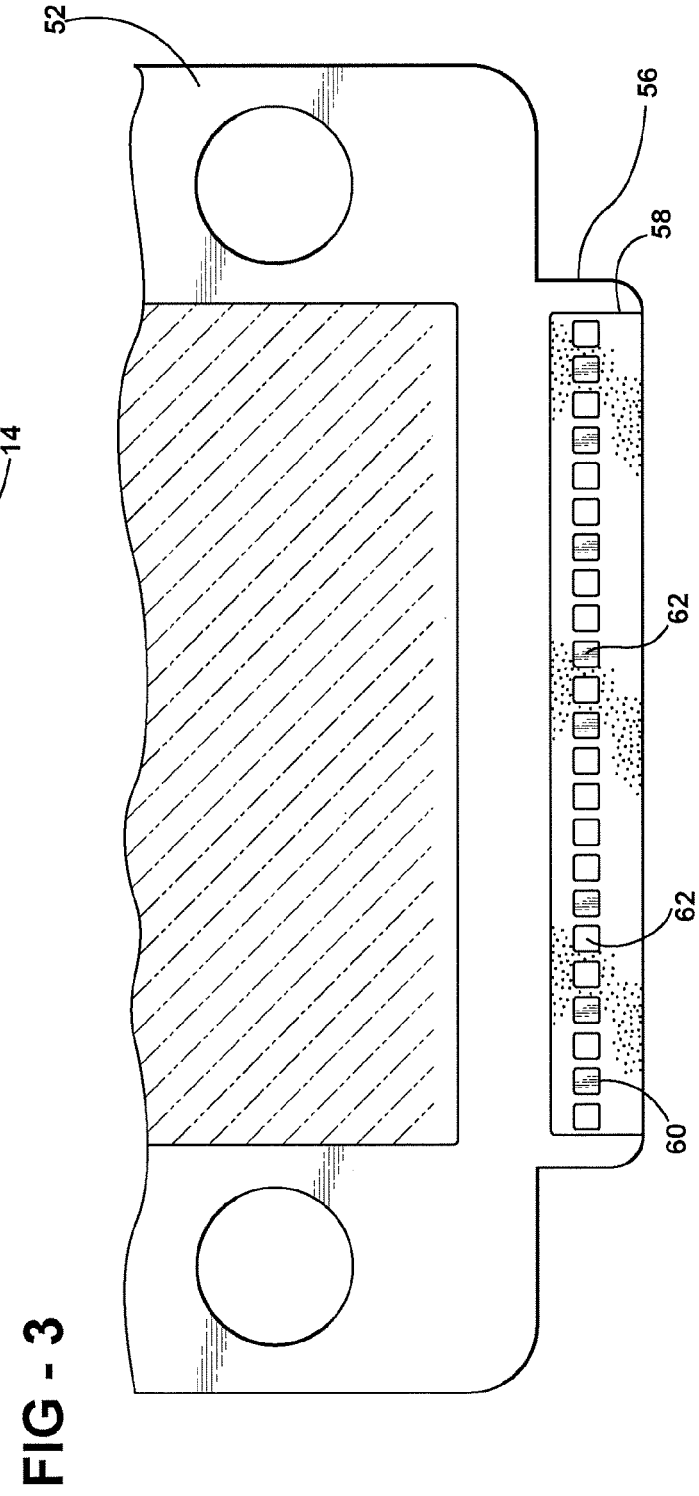
FIG. 3 is a fragmentary top plan view of the anode plate of the fuel cell shown in FIG. 2, the anode plate including an insulative strip disposed on a conductive wing protruding from a lateral edge thereof.

The conductive wing 56 of the anode side plate 52 includes an insulative strip 58 disposed thereon. The insulative strip 58, more clearly shown in FIG. 3, has at least one aperture 60 formed therein. The at least one aperture 60 provides selected electrical contact points 62 to the conductive wing 56 of the anode side fuel cell plate 52. A conductive material (not shown) may be provided in the insulative strip 64 at the location of the at least one aperture 60. The conductive material can provide the electrical contact points 62 to the conductive wing 56 of the anode side fuel cell plate 52. Further, it should be understood that the conductive material may have a desired electrical resistance to achieve a desired rate of electrical flow therethrough.

The electrically conductive body 64 is more clearly shown in FIGS. 4a and 4b. The body 64 includes a first insulating member 80, a second insulating member 88, and an electrically conductive member 84 disposed therebetween. The insulating members 80, 88 can be formed from any electrically insulating material. As a non-limiting example, Kapton® polyimide film manufactured by DuPont has shown acceptable results as the insulating material. The three members 80, 84, 88 of the body 64 are joined together using an adhesive (not shown). It should be understood that the strips may be bonded together using other joining means as desired. The first insulating member 80 includes at least one aperture 82 formed therein. In an illustrative embodiment, the conductive member 84 is copper and includes at least one protuberance 70. It should be understood that other electrically conductive materials can be used to form the conductive member 84 as desired. The protuberance 70 is adapted to be received in and extend through the aperture 82 in the first insulating member 80. The first insulating member 80 substantially covers and electrically insulates the conductive member 84 from the conductive wing 56 of the anode plate 52, except for the protuberance 70. The second insulating member 88 has a width that is less than a width of the first insulating member 80 and a width of the conductive member 84 to leave a portion of a lower surface of the conductive member 84 exposed. The exposed portion of the conductive member 84 contacts the conductive wing 57 of the cathode plate 54.

In operation, the shorting device 50 is disposed between the conductive wings 56, 57 of two adjacent fuel cell plates 52, 54, as shown in FIG. 2. The electrically conductive body 64 extends outwardly from between the conductive wings 56, 57 of the fuel cell plates 52, 54 and is coupled to the holder 66. The exposed portion of the lower surface of the conductive member 84 is in slidable contact with the conductive wing 57 of the cathode plate 54, as shown in FIGS. 2 and 5a. The holder 66 and body 64 can be selectively positioned by the actuator 68. When the body 64 is in a first position, as shown in FIG. 5b, the protuberance 70 of the conductive member 84 is in contact with the insulative strip 58 disposed on the conductive wing 56 of the anode plate 52. In the first position, the electrical shorting device 50 is in an open position and the fuel cell is allowed to operate and contribute electrical flow to the fuel cell stack.

When desired, the actuator 68 causes the holder 66 and the body 64 to slide to a second position. The second position, shown in FIG. 5c, locates the protuberances 70 in alignment with the apertures 60 of the insulative strip 58. In this position the protuberances 70 contact the conductive wing 56 of the anode plate 52 and close the electrical circuit between the adjacent anode plate 52 and cathode plate 54, effectively shorting out the individual cell. The shorting device 50 is moved to the second position when conditions exist that could cause the polarity of the cell to reverse such as, for example, during the startup and shutdown of the fuel cell. By placing the body 64 in the second position shown in FIG. 5c and shorting out the fuel cell, the electrical potential between the plates is minimized. The minimization of the electrical potential between the plates militates against the reverse polarity condition and the associated degradation of the catalyst layers within the fuel cell 10.

It should be understood that at least a third position (not shown) can be provided for the body 64. The third position would provide a desired electrical resistance to the circuit between the adjacent fuel cell plates 52, 54. The resistance would provide a longer time period for the minimization of the electrical potential between the two fuel cell plates 52, 54 and optimize the peak current flow therebetween. The resistance can be accomplished by selectively depositing a resistive coating onto the insulative strip 58. A configuration of the insulated strip 58 having electrically resistive windows (not shown) and conductive windows (not shown) may thereby be provided. It should be understood that other configurations may be provided as desired.

The embodiment shown in FIGS. 2 through 5 allows the shorting device 50 to be disposed between adjacent plates without requiring a substantial increase in the space therebetween. The body 64 is adapted to fit in a typical gap between two adjacent plates in the fuel cell.

A voltage differential between adjacent fuel cell plates is typically less than about one volt. However, a current therebetween can be about 300 amps or more. The plurality of protuberances 70 provides an optimized contact area between the conductive wing 56 of the anode plate 52 and the conductive member 84 of the body 64. The optimized contact area militates against a degradation of the protuberances 70 caused by the current. Further, compared to a typical single electrical wire, the conductive member 84 provides an optimized surface area for contacting the conductive wing 57 of the cathode plate 54 and an overall optimized surface area for distribution of the electrical flow therebetween. The optimized surface area of the conductive member 84 militates against the current causing a degradation of the conductive member 84.

The embodiment in FIGS. 2 through 5 shows the shorting device 50 oriented with the protuberance 70 in selective contact with the conductive wing 56. It should be understood the orientation of the shorting device 50 and the insulative strip 58 can be reversed. In the reversed orientation, the insulative strip 58 is disposed on the conductive wing 57 and the protuberance 70 is in selective contact the conductive wing 57. It should also be understood that a protuberance can be formed on the conductive wing 57 with an insulative strip disposed on the body 64.

The shorting device 50 can be included between the anode and cathode plate of every fuel cell 10 within a fuel cell stack. Each fuel cell 10 may be shorted under operating conditions likely to cause a polarity reversal of the individual fuel cell 10. By militating against the polarity reversal in each fuel cell 10, the degradation of the catalyst layers within each fuel cell is minimized, resulting in an increase in the useful life of the fuel cell stack.

Figure 6:
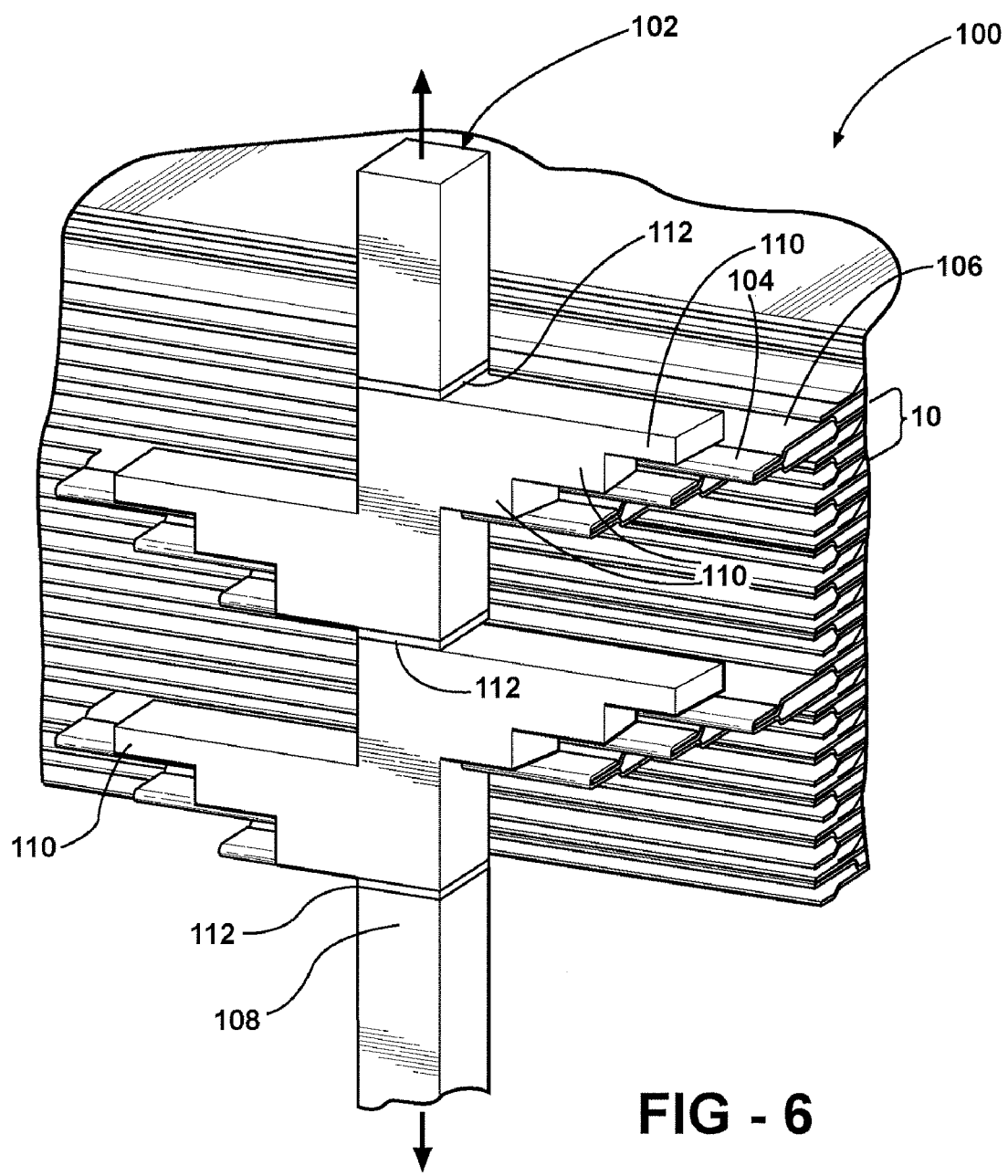
FIG. 6 is a fragmentary perspective view of a shorting device for a fuel cell in accordance with another embodiment of the invention, wherein a vertical shorting bar is selectively positioned to short out adjacent fuel cells.

FIG. 6 illustrates a further embodiment of the invention showing a fuel cell stack 100 including a vertical shorting device 102 disposed adjacent thereto. An electrically conductive tab 104 protrudes from a lateral edge of a fuel cell plate 106 of the fuel sell stack 100. The tabs 104 are provided at varying locations along the lateral edge so that when the plates 106 are vertically stacked, the tabs 104 are staggered. The vertical shorting device 102 includes an electrically conductive shorting body 108 disposed adjacent the fuel cell stack 100. A plurality of shorting contacts 110 extend from either side of the body 108. The body 108 is in communication with an actuator (not shown) that provides vertical motion thereto. In a first position the shorting contacts 110 of the body 108 are not contacting the tabs 104. In the first position, the vertical shorting device 102 is in the open position and each individual fuel cell 10 can operate and contribute electrical flow to the fuel cell stack 100. The actuator can move the body 108 to a second position where the shorting contacts 110 of the body 108 contact the tabs 104 and short out the fuel cell 10.

In the embodiment depicted in FIG. 6, fuel cells 10 are shorted out in groups. The number of fuel cells 10 shorted together can be limited, for example, to approximately ten or less to minimize a risk of electrical arcing between the cells 10. As a non-limiting example, the shorting bar 108 can be adapted to include electrically insulated sections 112, where each section 112 facilitates a shorting out of ten or fewer fuel cells 10. In such an arrangement, a single electrically conductive shorting body 108 that includes a plurality of electrically insulated sections 112 can be used to short out a plurality of groups of fuels cells in the fuel cell stack 100. The remaining structure and use is the same as described above for the embodiment shown in FIGS. 2 to 5.

Figure 7A:
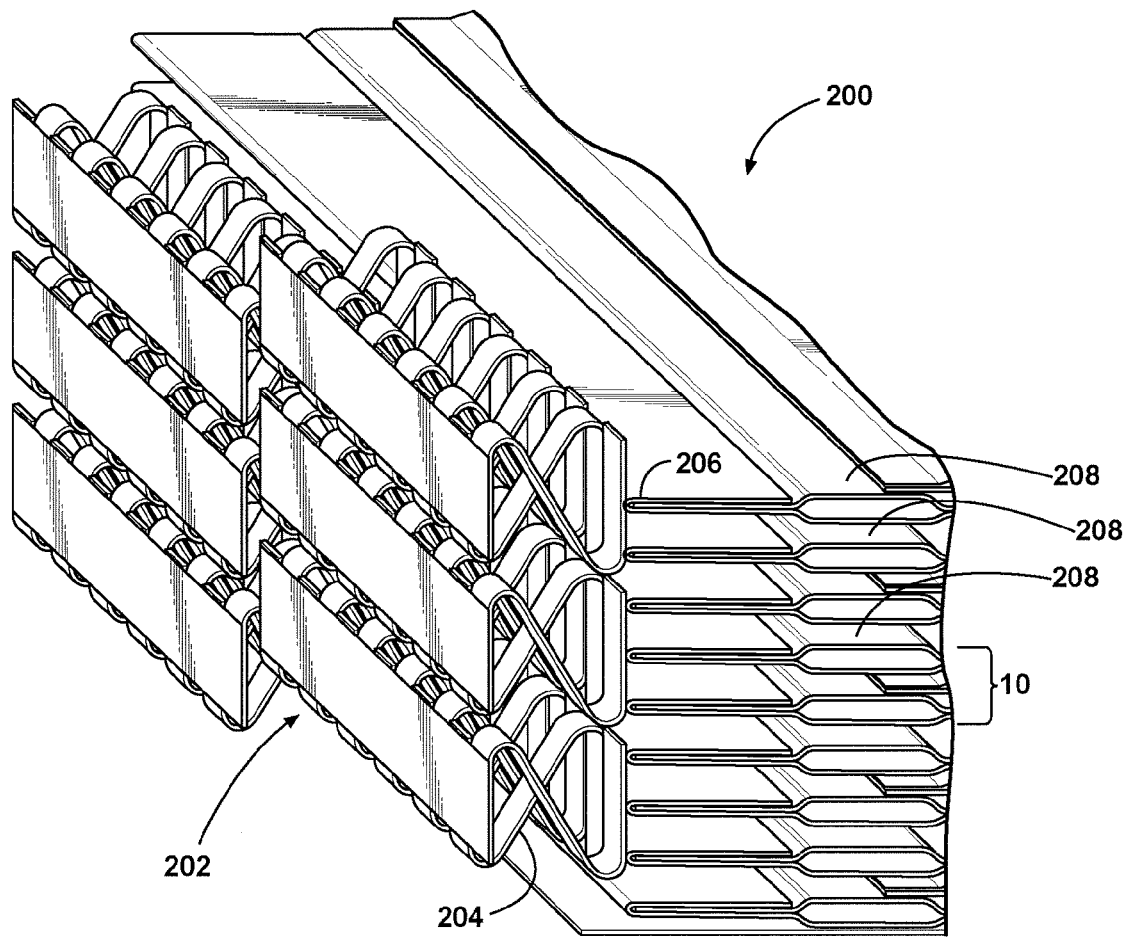
FIG. 7a is a fragmentary perspective view of a shorting device for a fuel cell in accordance with another embodiment of the invention, wherein an electrical contact finger is selectively positioned to short out adjacent fuel cells.

FIG. 7a illustrates an additional embodiment of the invention showing a fuel cell stack 200 including a horizontal shorting device 202 disposed adjacent thereto. The horizontal shorting device 202 includes at least one electrically conductive flexible finger 204. The fingers 204 are adapted to contact an electrically conductive tab 206 of adjacent fuel cell plates 208. The finger 204 is controlled by an actuator (not shown) that moves the finger 204 inwardly toward the stack 200 or outwardly away from the stack 200. In a first position the fingers 204 are not in contact with the tab 206 of the adjacent fuel cell plates 208. In the first position, the horizontal shorting device 202 is in the open position and the fuel cell 10 can operate and contribute electrical flow to the fuel cell stack 200. The actuator can move the fingers 204 inwardly to a second position, as shown in FIG. 7a. In the second position, the fingers 204 contact the tab 206 of the fuel cell plates 208 and short out the respective fuel cell 10. The horizontal shorting device 202 can be adapted to facilitate a shorting out individual or groups of fuel cells 10. To short out individual fuel cells 10, for example, a single finger 204 is controlled by a single actuator. To short out more than one fuel cell 10, for example, a plurality of the fingers 204 are coupled together and controlled by a single actuator. As a further non-limiting example, the number of cells 10 shorted together can be limited to approximately ten or less to minimize the risk of electrical arcing between the cells 10.

Figure 7B:
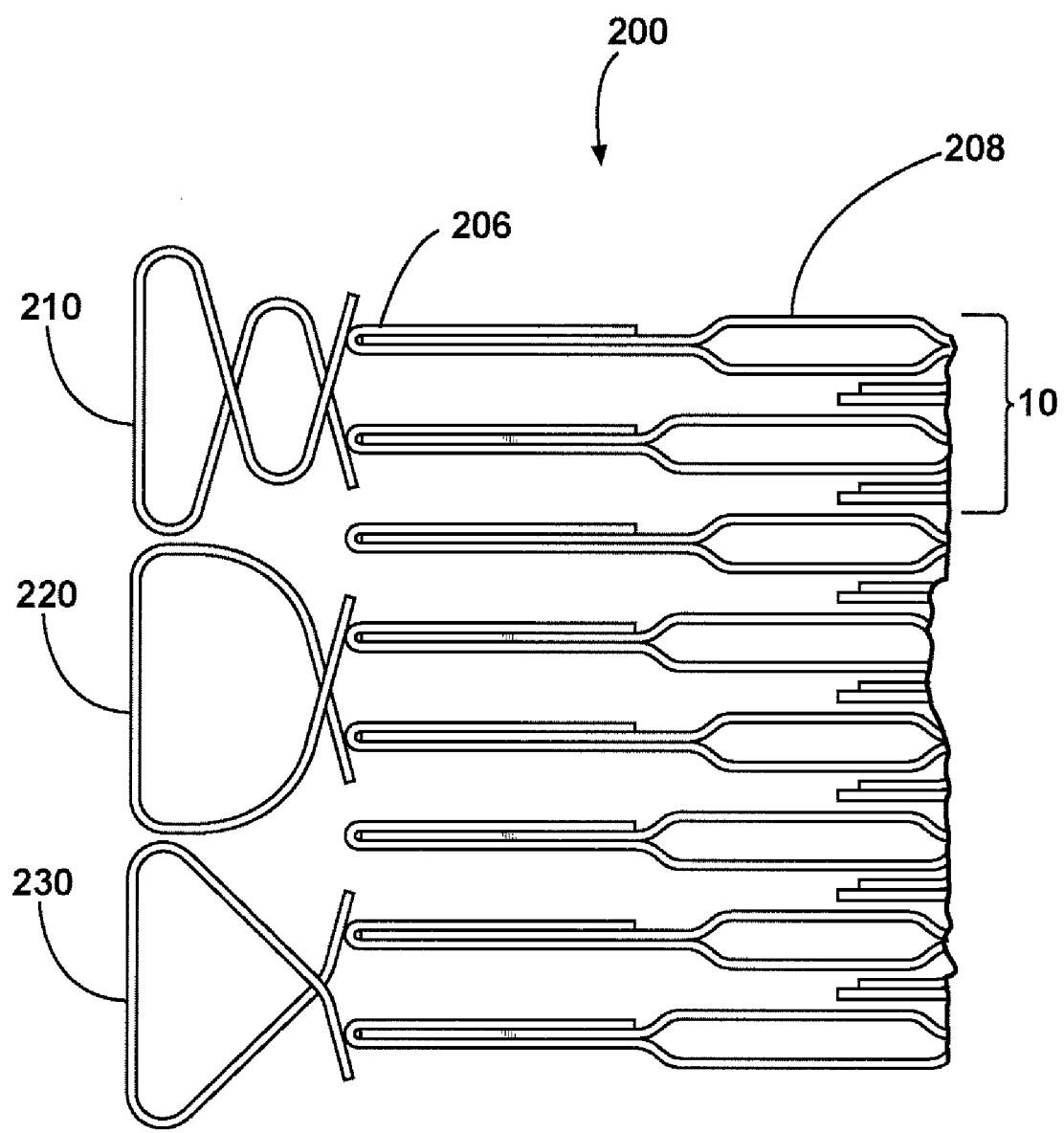
FIG. 7b is a fragmentary cross-sectional view of a shorting device for a fuel cell in accordance with another embodiment of the invention.
Figure 7C:
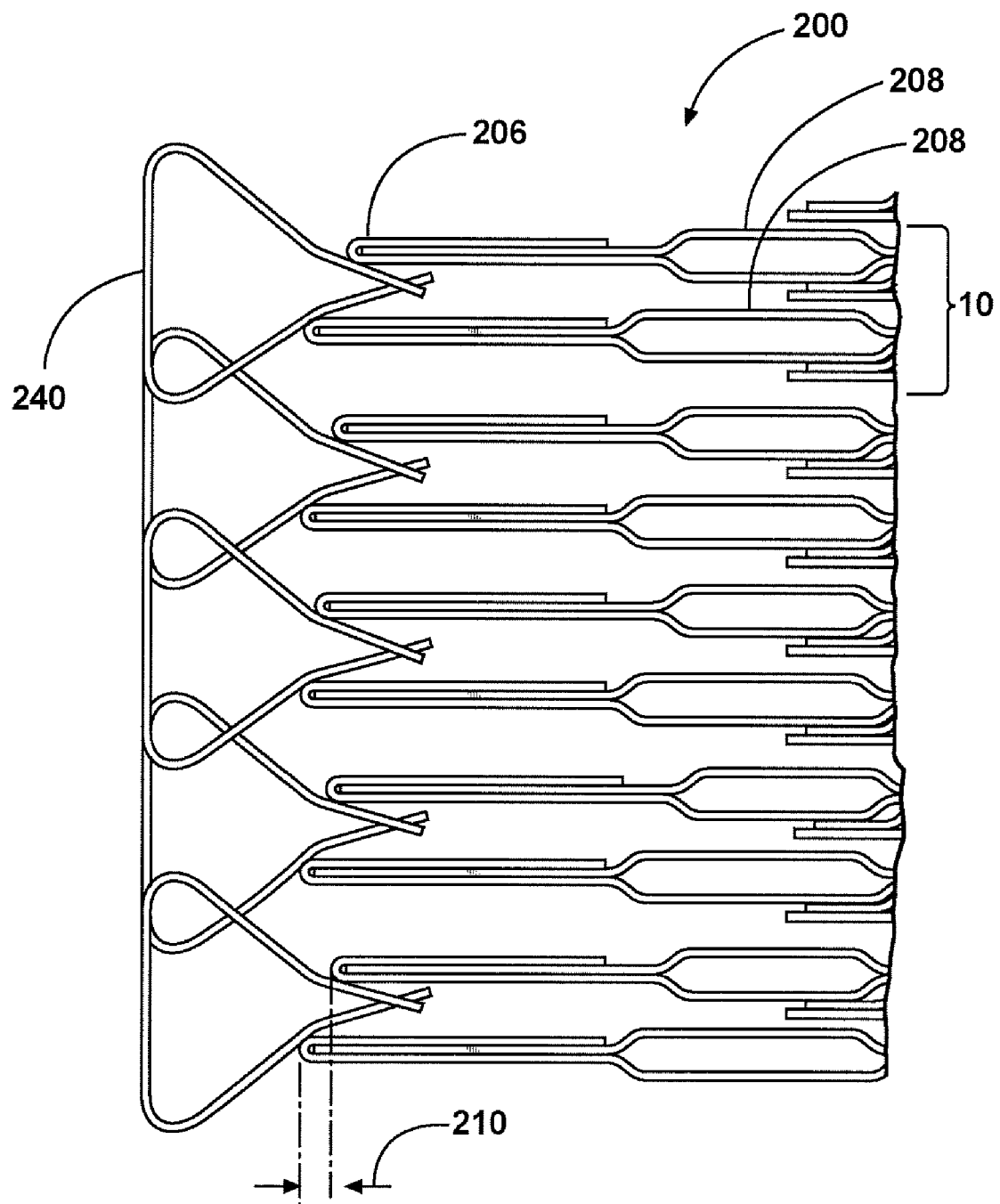
FIG. 7c is a fragmentary cross-sectional view of a shorting device for a fuel cell in accordance with another embodiment of the invention.

It should be understood the fingers 204 can be shaped as desired to provide a required flexibility. As a non-limiting example, FIG. 7b illustrates fingers 210, 220, 230 which are illustrative examples of suitable finger shapes. FIG. 7c illustrates a particularly useful finger 240. Finger 240 is adapted to protrude into a gap between adjacent fuel cell plates 208. The ends of the finger 240 are resilient and can deflect upon contact with the tabs 206 of the respective fuel cell plates 208. The deflection of the finger 240 optimizes an electrical contact between the finger 240 and the tab 206. A typical fuel cell stack 200 can include some vertical misalignment 210 between adjacent fuel cell plates 208. The finger 240 is adapted to accommodate the typical amount of the misalignment 210 between adjacent fuel cell plates 208 in the fuel cell stack 200. The finger 240 militates against the misalignment 210 from causing a gap between the finger 240 and the tab 206 of the fuel cell plates 208 when the horizontal shorting device 202 is in the second position. The remaining structure and use is the same as described above for the embodiment shown in FIGS. 2 to 5.

Figure 8:
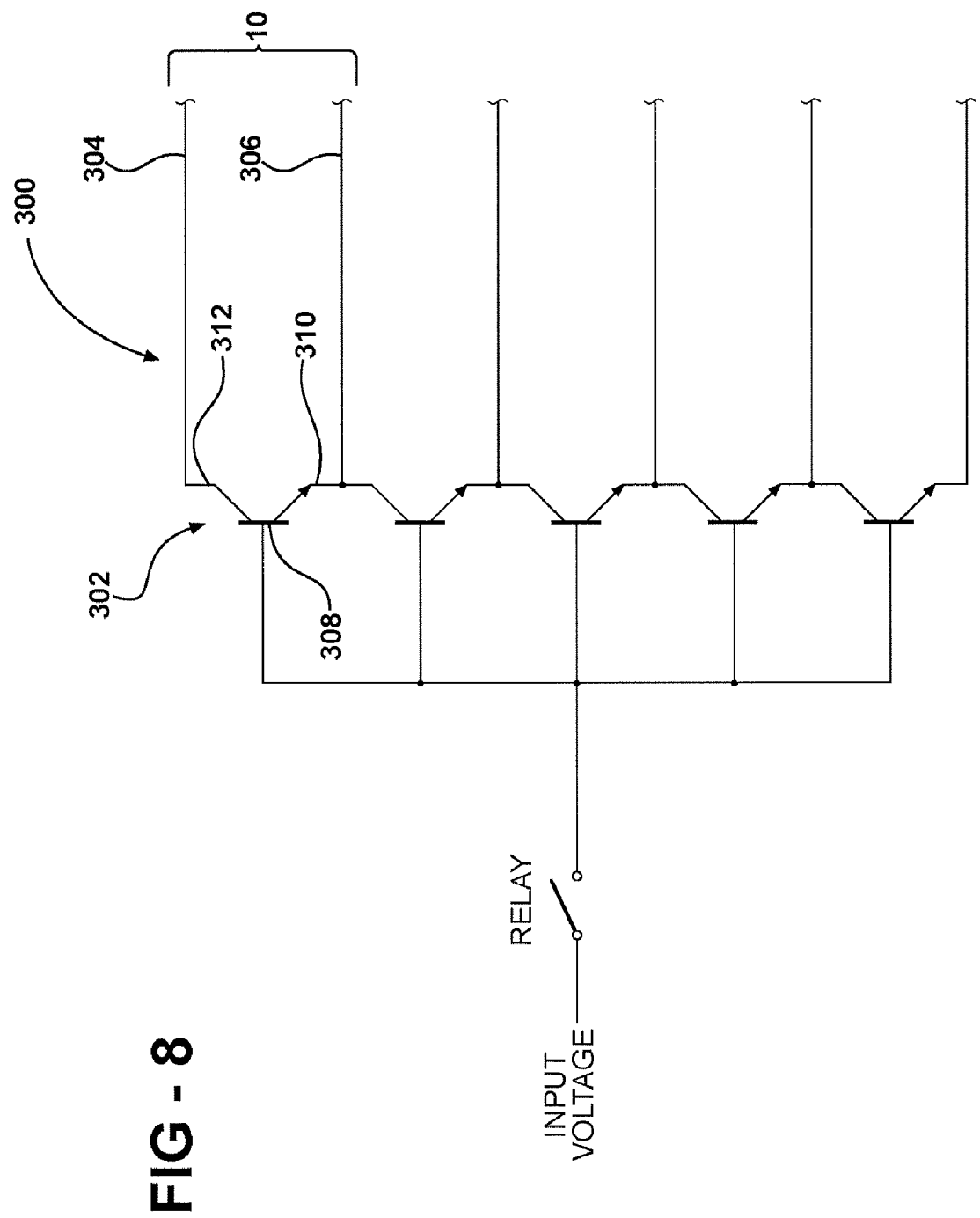
FIG. 8 is a schematic view of a shorting device for a fuel cell according to another embodiment of the invention, wherein the shorting device is a transistor.

FIG. 8 illustrates an alternative embodiment of the electrical shorting device showing an electrical schematic of a fuel stack 300 including an electrical transistor shorting device 302. The electrical transistor 302 is disposed between an anode side fuel cell plate 304 and a cathode side fuel cell plate 306. In the embodiment shown, a metal oxide semiconductor field effect transistor (MOSFET) is employed as the shorting device 302. To short out the individual fuel cell 10, a low power input voltage is applied to a gate 308 of the transistor 302. This allows current to flow from a drain electrode 310 to a source electrode 312, shorting out the fuel cell 10. A transistor 302 can be disposed between adjacent fuel cells 10 in the fuel cell stack 300 to selectively short out individual fuel cells 10 or groups of fuel cells 10. The remaining structure and use is the same as described above for the embodiment shown in FIG. 2 to 5.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical shorting device for a fuel cell comprising:
   an electrically conductive body disposed adjacent an outer edge of an anode plate and an outer edge of a cathode plate;
   an actuator coupled to the body and adapted to selectively position the body between an electrically conductive and a non-electrically conductive position to selectively provide an electrical communication between the anode plate and the cathode plate;
   wherein the electrically conductive body further comprises:
   a first insulating member having an upper surface, a lower surface, and at least one aperture formed therein;
   a second insulating member having an upper surface and a lower surface;
   an electrically conductive member disposed between the first insulating member and the second insulating member, the electrically conductive member having an upper surface and a lower surface, the upper surface including at least one protuberance adapted to extend through the aperture of the first insulating member, and the lower surface including an exposed portion; and
   a joining means adapted to couple the electrically conductive member to the first insulating member and the second insulating member.

2. The shorting device according to claim 1, wherein the anode plate includes a first conductive wing extending outwardly from an edge of the anode plate and the cathode plate includes a second conductive wing extending outwardly from an edge of the cathode plate.

3. The shorting device according to claim 2, wherein at least one of the first and second conductive wings includes an insulative strip disposed thereon.

4. The shorting device according to claim 3, wherein the insulative strip includes at least one aperture formed therein.

5. The shorting device according to claim 1, wherein the joining means includes a first adhesive disposed between the lower surface of the first insulating member and the top surface of the electrically conductive member, and a second adhesive disposed between the upper surface of the second insulating member and the bottom surface of the electrically conductive member.

6. The shorting device according to claim 1, wherein the electrically conductive member is positionable in a first position wherein the protuberance is in contact with the insulative strip disposed on the at least one of the first and second conductive wings, the first position being an electrically open position of the shorting device.

7. The shorting device according to claim 1, wherein the electrically conductive member is positionable in a second position wherein the protuberance is in alignment with the apertures of the insulative strip disposed on the at least one of the first and second conductive wings, the protuberance extending through the aperture and in electrical communication with at least one of the first and second conductive wings, the second position being an electrically shorted position of the shorting device.

8. The shorting device according to claim 1, wherein the insulative strip disposed on the at least one of the first and second conductive wings includes a conductive material disposed thereon, the conductive material having an electrical resistance sufficient to dissipate an electrical current flowing through the conductive material.

9. The shorting device according to claim 8, wherein the electrically conductive member is positionable in a third position wherein the protuberance is in contact with the conductive material.

10. A fuel cell stack comprising:
   at least a first bipolar plate and a second bipolar plate, each bipolar plate having an anode side and a cathode side, wherein the anode side of the first bipolar plate faces the cathode side of the second bipolar plate;
   at least one proton exchange member disposed between the anode side of the first bipolar plate and the cathode side of the second bipolar plate;
   at least one shorting device including an electrically conductive body disposed adjacent an outer edge of the first bipolar plate and an outer edge of the second bipolar plate, the at least one shorting device adapted to selectively provide electrical communication between the at least one first bipolar plate and the second bipolar plate;
   an actuator coupled to the body to selectively position the body between an electrically conductive and a non-electrically conductive position;
   wherein the bipolar plate includes a shorting tab extending from an edge thereof; and
   wherein the electrically conductive body is at least one electrically conductive finger having resilient ends adapted to contact the shorting tab of the bipolar plate and the actuator is coupled to the finger to position the finger.

11. The fuel cell stack according to claim 10, wherein the shorting device is disposed between the first bipolar plate and the second bipolar plate, the shorting device further comprising:
   a holder coupled to the body and the actuator, wherein the holder facilitates a positioning of the body.

12. The fuel cell stack according to claim 10, wherein the shorting device is disposed adjacent the fuel cell stack, the shorting device further comprising:
   a plurality of shorting contacts extending from at least one side of the body, the shorting contacts adapted to contact the shorting tab of the bipolar plate.

13. The fuel cell stack according to claim 10, wherein the body includes at least one electrically insulated section.

14. The fuel cell stack according to claim 12, wherein the shorting device is positionable in a first position that provides a gap between the shorting contact and the shorting tab of the bipolar plate, the first position being an electrically open position of the shorting device, and a second position that places the shorting contacts in electrical communication with the shorting tabs, the second position being an electrically shorted position of the shorting device.

15. The fuel cell stack according to claim 10 wherein the shorting device is positionable in a first position that provides a gap between the at least one finger and the shorting tab of the bipolar plate, the first position being an electrically open position of the shorting device, and a second position that places the at least one finger in electrical communication with the shorting tabs, the second position being an electrically shorted position of the shorting device.

* * * * *